(12) United States Patent
Pang

(10) Patent No.: US 11,441,686 B2
(45) Date of Patent: Sep. 13, 2022

(54) FLUID FLOW CONTROL DEVICE WITH VALVE SEAT CONFIGURED TO MITIGATE FLASHING

(71) Applicant: Control Components, Inc., Rancho Santa Margarita, CA (US)

(72) Inventor: Chulho Pang, Gyeonggi-do (KR)

(73) Assignee: Control Components, Inc., Rancho Santa Margarita, CA (US)

( * ) Notice: Subject to any disclaimer, the term of this patent is extended or adjusted under 35 U.S.C. 154(b) by 0 days.

(21) Appl. No.: 17/167,401

(22) Filed: Feb. 4, 2021

(65) Prior Publication Data

US 2022/0243824 A1     Aug. 4, 2022

(51) Int. Cl.
    *F16K 1/54*       (2006.01)
    *F16K 1/42*       (2006.01)
    *F16K 1/36*       (2006.01)

(52) U.S. Cl.
    CPC ............... *F16K 1/54* (2013.01); *F16K 1/36* (2013.01); *F16K 1/42* (2013.01)

(58) Field of Classification Search
    CPC ............... F16K 1/54; F16K 1/36; F16K 1/42
    See application file for complete search history.

(56) References Cited

U.S. PATENT DOCUMENTS

| | | | | |
|---|---|---|---|---|
| 3,252,480 A | * | 5/1966 | Odendahl | F16K 47/04 137/625.3 |
| 3,469,591 A | * | 9/1969 | Odendahl | F16K 47/06 251/126 |
| 3,791,413 A | * | 2/1974 | Muller | F16K 47/04 137/625.3 |
| 3,971,411 A | * | 7/1976 | Baumann | F16K 1/54 137/625.3 |
| 4,634,095 A | * | 1/1987 | Taylor | F16K 47/04 137/625.37 |
| 5,803,119 A | * | 9/1998 | Steinke | F16K 47/04 137/625.37 |
| 7,959,127 B2 | | 6/2011 | Newton et al. | |

(Continued)

FOREIGN PATENT DOCUMENTS

GB     2272747 A     5/1994

OTHER PUBLICATIONS

Fisher Controls International LLC. "Fisher Micro Trims for Globe and Angle Valve Applications," 8 pages. Aug. 2012.

*Primary Examiner* — Patrick C Williams
(74) *Attorney, Agent, or Firm* — Stetina Brunda Garred and Brucker; Mark B. Garred

(57) ABSTRACT

A fluid control valve includes a housing defining a fluid inlet and a fluid outlet. A valve seat is coupled to the housing and is positioned between the inlet and the outlet. The valve seat includes an end surface, seating surface extending from the end surface toward the seat axis, and a groove surface extends from the seating surface and defines a groove extending around the seat axis. The valve seat further includes an inner surface defining a central bore extending along the seat axis. A spindle is disposed within the housing and is reciprocally moveable between closed and open positions within the central bore of the valve seat. The spindle defines a longitudinal axis and includes an outer surface and a plurality of flow passages formed in the outer surface to prescribed lengths and extending in generally parallel relation to the axis of the spindle.

20 Claims, 5 Drawing Sheets

(56) References Cited

U.S. PATENT DOCUMENTS

| | | |
|---|---|---|
| 8,393,355 B2 | 3/2013 | Samy |
| 9,022,071 B2 | 5/2015 | Venkitasubramony et al. |
| 9,175,787 B2 | 11/2015 | Nazir et al. |
| 9,556,970 B2 | 1/2017 | Mastrovito |
| 10,094,489 B2 | 10/2018 | Freitas et al. |
| 2007/0040136 A1* | 2/2007 | Caprera .............. F16K 1/482 251/122 |
| 2015/0083244 A1* | 3/2015 | Naziri ............... F16K 31/508 251/127 |

* cited by examiner

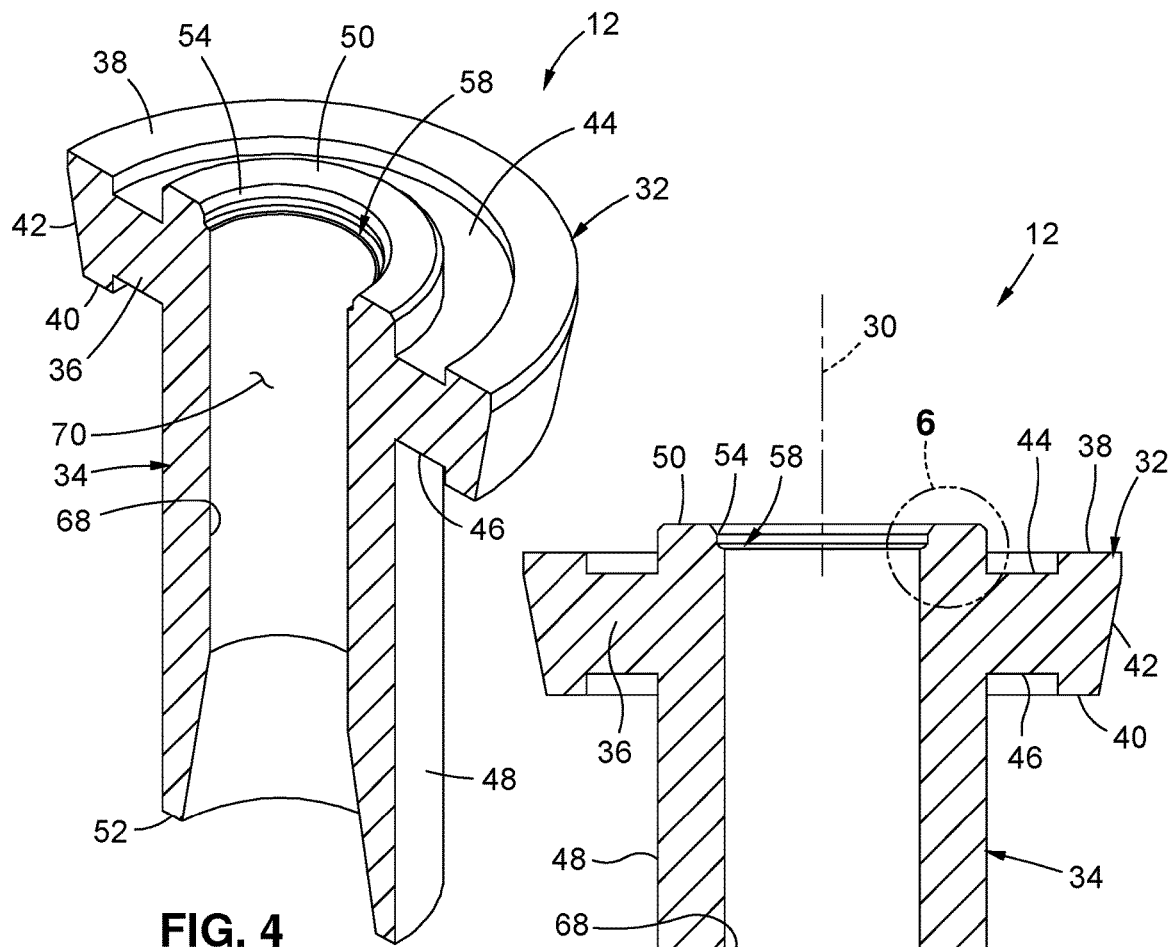
FIG. 4
FIG. 5
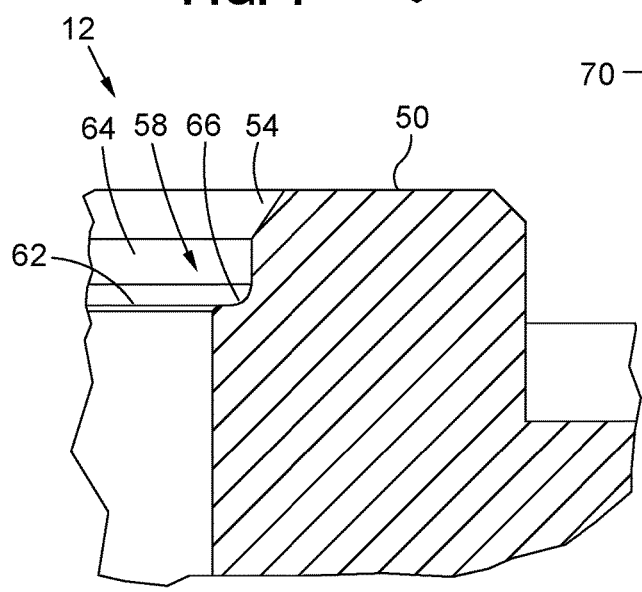
FIG. 6

FLUID FLOW CONTROL DEVICE WITH VALVE SEAT CONFIGURED TO MITIGATE FLASHING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a flow control valve, and more specifically, to a spindle-type flow control valve having, among other things, a valve seat specifically configured to mitigate flashing so as to reduce erosion of the control valve.

2. Description of the Related Art

Fluid control valves are known in the art to include stems and plugs that are linearly displaced during normal operation of the valve. Within these valves, often referred to as linear displacement valves, the stem or plug may be seated against a valve seat to assume a closed position to prevent fluid flow through the valve. The stem or plug may be linearly moved away from the valve seat toward an open position to allow fluid to flow through the passageway(s) provided within the valve. Linear displacement valves may be configured from "over plug flow" wherein fluid flows radially inward into an interior from the exterior. As an alternative to over plug flow, other linear displacement valves are configured for "under plug flow" wherein fluid may flow axially upward into an interior of the valve from the exterior thereof.

Linear control valves are oftentimes used to control liquids that are at elevated pressures. As the liquid passes through constrictive passages of the control valve, the liquid may experience flashing, which refers to the phenomenon where the absolute pressure of the liquid falls below the vapor pressure of that substance, which in turn causes the liquid to boil. In most cases, flashing is undesirable for several reasons. The effect of boiling liquid within the constrictive passages of the control valve may result in flow through the valve becoming choked by the rapid expansion of the liquid to vapor as it boils, which reduces the flow capacity of the valve. Furthermore, flashing tends to be destructive to the valve, as the boiling action may propel tiny droplets of liquid at extremely high velocities over the valve structure, which may erode the structure over time.

Accordingly, there is a need in the art for a control valve specifically configured to mitigate flashing within the valve. Various aspects of the present disclosure address this particular need, as will be discussed in more detail below.

BRIEF SUMMARY

Various aspects of the present disclosure are directed to a control valve configured to reduce valve erosion caused by flashing so as to improve the valve lifecycle. The control valve may be specifically configured to move a flashing damage point away from the trim to lessen the level of damage on the critical parts to control leakage and valve performance.

According to one embodiment, there is provided a fluid control valve comprising a housing defining a fluid inlet and a fluid outlet. A valve seat is coupled to the housing and is positioned between the fluid inlet and the fluid outlet. The valve seat includes an inner surface defining a central bore extending along a seat axis. A groove surface extends from the inner surface and defines a groove extending around the seat axis, with at least a portion of the groove surface extending radially outward relative to the seat axis. The valve seat additionally includes a seating surface extending from the groove surface. The valve additionally includes a spindle disposed within the housing and defining a longitudinal axis. The spindle includes an outer surface and a plurality of flow passages formed in the outer surface to prescribed lengths and extending in generally parallel relation to the longitudinal axis of the spindle. The spindle is moveable relative to the valve seat between closed and open positions, with movement of the spindle from the closed position toward the open position allowing fluid to flow between the fluid inlet and the fluid outlet along at least one of the plurality of flow passages.

The plurality of flow passages may be spaced circumferentially about the outer surface of the spindle. Each of the plurality of flow passages may extend along at least two axes.

The spindle may include an end surface, and the plurality of flow passages may include a first flow passage extending from the end surface in a direction parallel to the longitudinal axis to define a first length, and a second flow passage extending from the end surface in a direction parallel to the longitudinal axis to define a second length greater than the first length.

The spindle may include at least one labyrinth groove formed therein, and in some embodiments, two or more labyrinth grooves in spaced relation to each other. A portion of the spindle may be in contact with the seating surface when the spindle is in the close position.

The groove surface of the valve seat may include a first segment generally perpendicular to the seat axis, a second segment generally parallel to the seat axis and a corner segment connecting the first segment and the second segment. The corner segment may be rounded.

The seating surface of the valve seat may extend at an angle relative to the seat axis.

According to another embodiment, there is provided a fluid control valve including a housing defining a fluid inlet and a fluid outlet. A valve seat is coupled to the housing and is positioned between the fluid inlet and the fluid outlet. The valve seat extends around a seat axis and includes an end surface extending around the seat axis. A seating surface extends from the end surface toward the seat axis, and a groove surface extends from the seating surface and defines a groove extending around the seat axis. The valve seat further includes an inner surface defining a central bore extending along the seat axis. A spindle is disposed within the housing and is reciprocally moveable between closed and open positions within the central bore of the valve seat. The spindle defines a longitudinal axis and includes an outer surface and a plurality of flow passages formed in the outer surface to prescribed lengths and extending in generally parallel relation to the axis of the spindle.

The end surface of the valve seat may be perpendicular to the seat axis. The seating surface may extend at an angle relative to a plane defined by the end surface, with the angle being between 0-90 degrees. A portion of the groove surface of the valve seat may extend parallel to the seat axis.

The groove surface may include a first segment generally perpendicular to the seat axis, a second segment generally parallel to the seat axis and a corner segment connecting the first segment and the second segment. The corner segment may be rounded.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a partial cross sectional, upper perspective view of the valve seat;

FIG. 5 is a partial cross sectional, front view of the valve seat depicted in FIG. 4;

FIG. 6 is an enlarged view of section 6-6 identified in FIG. 5;

Common reference numerals are used throughout the drawings and the detailed description to indicate the same elements.

DETAILED DESCRIPTION

Figure 1:
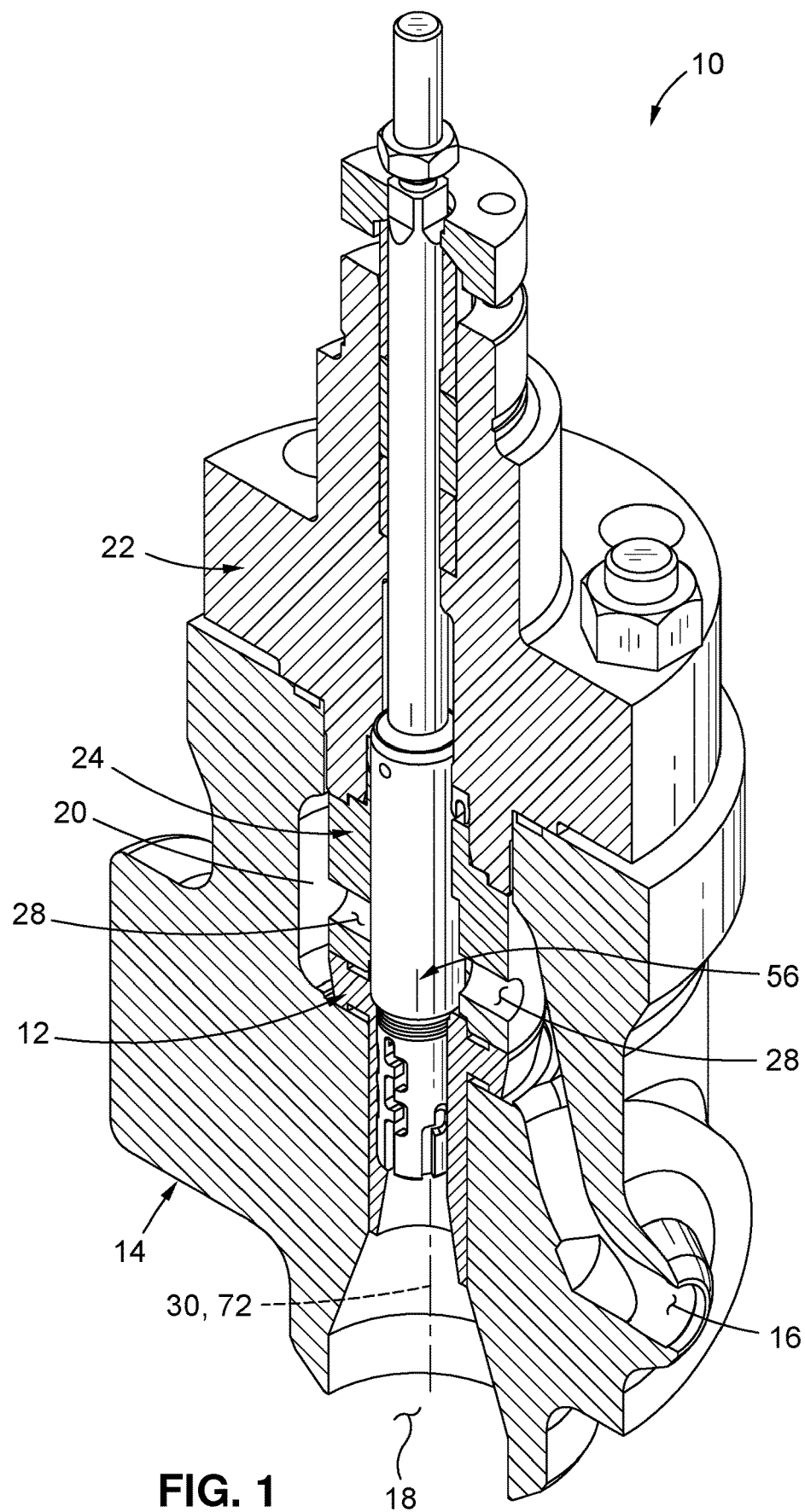
FIG. 1 is a partial cross sectional, upper perspective view of a fluid control valve having a valve seat configured to mitigate flashing.

The detailed description set forth below in connection with the appended drawings is intended as a description of certain embodiments of a fluid control valve and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a fluid control valve 10 specifically configured to mitigate flashing associated with operation of the valve 10. The valve 10 may be a linear displacement valve including a include a valve seat 12 configured to interface with a linearly displaceable spindle having a plurality of flow passages formed therein to control fluid flow through the valve 10. The valve seat 12 may be specifically configured to include a circular groove extending into the valve seat 12 from a seating surface of the valve seat 12. Consequently, the configuration and position of the groove within the valve seat 12 may provide an expanded flow region adjacent to, yet spaced from, the interface between the spindle and the valve seat 12. As such, should flashing occur within the valve 12, it would likely occur within the groove, and thus, any corresponding flashing damage point of the valve 10 would be moved away from the critical parts in order to control leakage levels of the valve 12, as well as improve overall performance of the valve 12.

Figure 2:
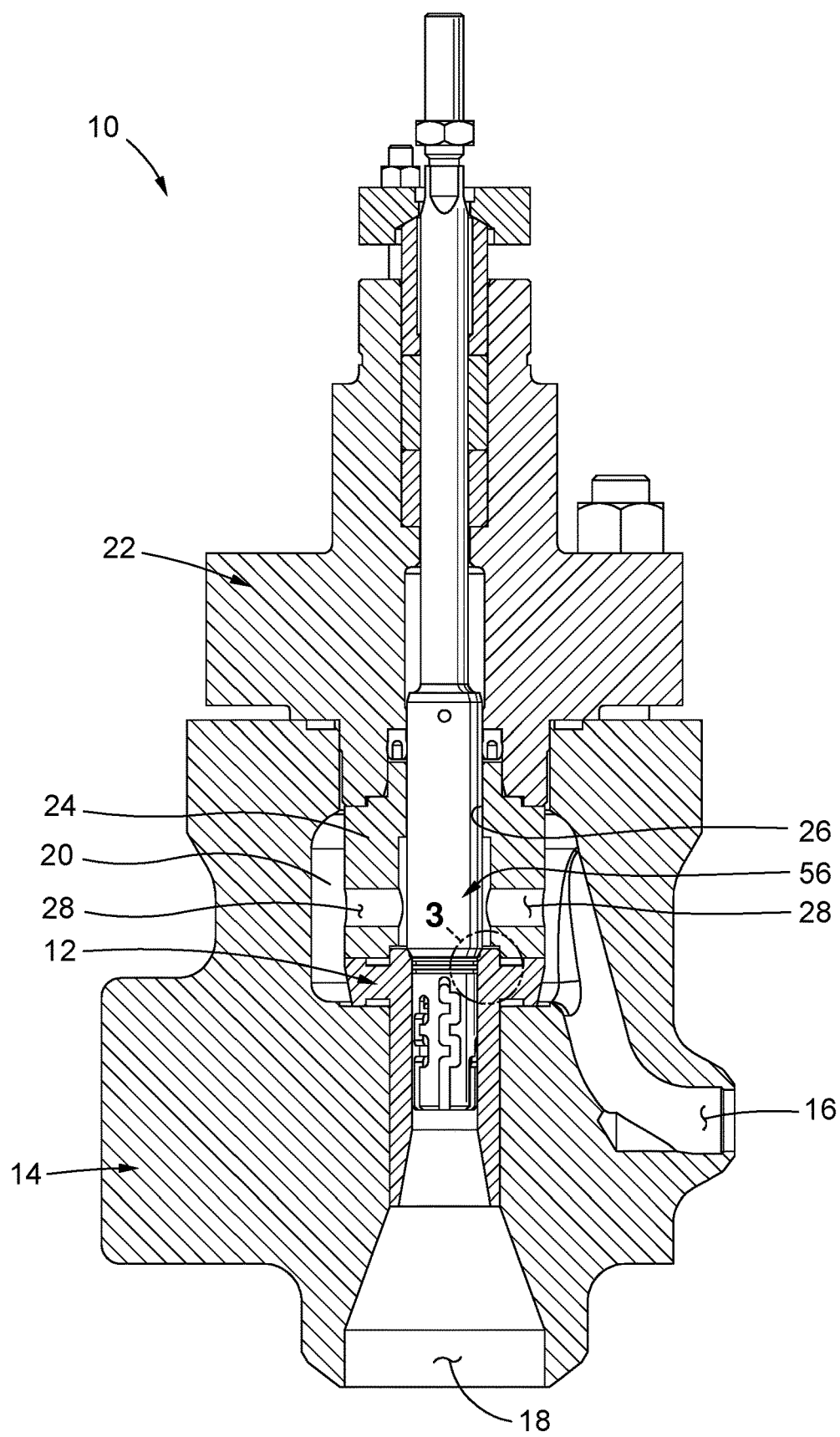
FIG. 2 is a partial cross sectional, front view of the fluid control valve depicted in FIG. 1.

Referring now specifically to FIGS. 1 and 2, the fluid control valve 10 may include a housing 14 having a fluid inlet 16 and a fluid outlet 18, each of which fluidly communicate with an interior chamber or valve gallery 20. The valve 10 may additionally include a bonnet 22, which may be attached to the housing 14 and partially enclose the gallery 20. As seen in FIGS. 1 and 2, the attachment of the bonnet 22 to the housing 14 may be facilitated through the use of mechanical fasteners comprising a nut and bolt combination, although other attachment mechanisms may also be used.

Disposed within the gallery 20 of the housing 14 is an annular guide bushing 24, which includes an elongate bore 26 extending axially through the guide bushing 24. The bore 26 may not be of a uniform inner diameter. Rather, when viewed from the perspective shown in FIG. 2, the bore 26 includes an upper portion which is of first inner diameter, and a lower portion which is of a second inner diameter exceeding the first inner diameter. As a result, the upper and lower portions of the bore 26 are separated from each other by a continuous, annular shoulder defined by the guide bushing 24.

The guide bushing 24 additionally includes a plurality of circularly configured flow openings 28, which extend from the outer surface of the guide bushing 24 to the bore 26. As such, each of the flow openings 28 places the bore 26 into fluid communication with the valve gallery 20. Each flow opening 28 may extend radially relative to an axis of the bore 26 in prescribed angular intervals relative to each other.

The fluid control valve 10 also includes the valve seat 12, which is at least partially disposed within the gallery 20. Referring now specifically to FIGS. 3-6, the valve seat 12 extends around a seat axis 30 and may include an outer portion 32 and an inner portion 34 connected to the outer portion 32 via a connecting flange 36. The outer portion includes 32 an upper surface 38, a lower surface 40, and an outer surface 42 extending between the upper and lower surfaces 38, 40. The upper end of the outer surface 42 (e.g., adjacent the upper surface 38) may define an outer diameter that is substantially equal to the outer diameter of a lower portion of the guide bushing 24. Furthermore, the outer diameter of the outer surface 42 may be tapered such that, as viewed from the perspective shown in FIGS. 4-5, it decreases from the upper end toward the lower end thereof (e.g., adjacent the lower surface 40).

The connecting flange 36 may extend between the outer portion 32 and the inner portion 42, and include opposing upper and lower surfaces 44, 46 thereof. A distance between the upper and lower surfaces 44, 46 of the connecting flange 36 may be less than a distance between the upper and lower surfaces 38, 40 of the outer portion 32.

The inner portion 34 is connected to the connecting flange 36 and includes an outer surface 48 having an upper portion extending from the connecting flange 36 to an upper end surface 50, and a lower portion extending from the connecting flange to a lower end surface 52.

From the perspective shown in FIG. 6, moving downward from the upper end surface 50 on the inside of the valve seat 12 is a seating surface 54. The seating surface 54 of the valve seat 12 may extend at an angle relative to the seat axis 30 and the upper end surface 50. In the exemplary embodiment, the angle defined by the seating surface 54 and a plane defined by the upper end surface is between 0-90 degrees, and more preferably between 20-80 degrees. The seating surface 54 is configured to engage with a spindle 56 when the spindle 56 is in a closed position, as will be described in more detail below.

A groove surface 58 extends from the seating surface 54 and defines a groove 60 (see FIG. 3) extending around the seat axis 30. The groove surface 58 of the valve seat 12 may include a first segment 62 extending generally perpendicular to the seat axis 30, a second segment 64 extending generally parallel to the seat axis 30 and a corner segment 66 connecting the first segment 62 and the second segment 64, i.e., defining the transition between the first and second segments 62, 64. The corner segment 66 depicted in the exemplary embodiment is rounded, although the corner segment 66 may also be squared without departing from the spirit and scope of the present disclosure.

From the perspectives shown in FIGS. 4-6, extending downwardly from the groove surface 58 is an inner surface 68 which defines a central bore 70 extending along the seat axis 30 from the groove surface 58 to the lower end surface 52. The diameter of the central bore 70 may not be uniform, and instead may include an upper section that is of a first diameter and a lower section that is of a second diameter greater than the first diameter. From the perspective depicted in FIG. 5, the increased diameter of the lower section of the central bore 70 may allow for a downstream velocity reduction of fluid flowing downwardly through the valve seat 12. Furthermore, the configuration of the housing 14 downstream of the valve seat 12, between the valve seat 12 and the outlet 18 may further include an increasing diameter to achieve further downstream velocity reduction.

The valve seat 12 is effectively captured between the guide bushing 24 and the housing 14, with the guide bushing 24 and the valve seat 12 being positioned relative to each other such that the bore 26 of the guide bushing 24 is coaxially aligned with and fluidly communicates with the bore 70 of the valve seat 12.

Figure 7:
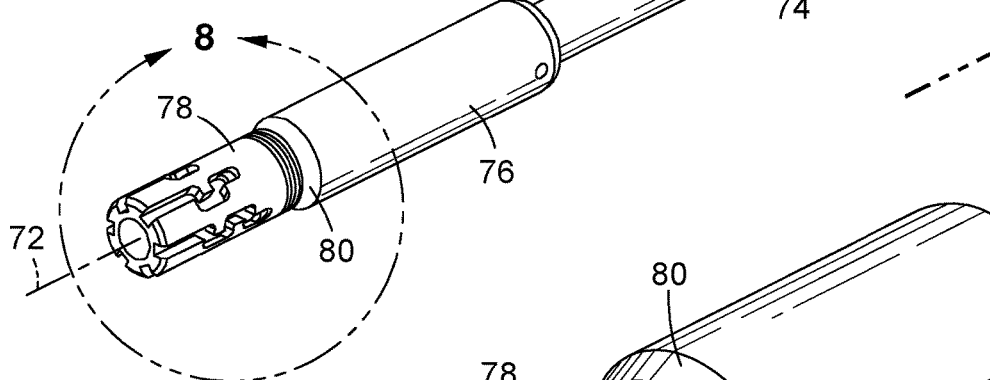
FIG. 7 is an upper perspective view of a spindle included in the fluid control valve.
Figure 8:
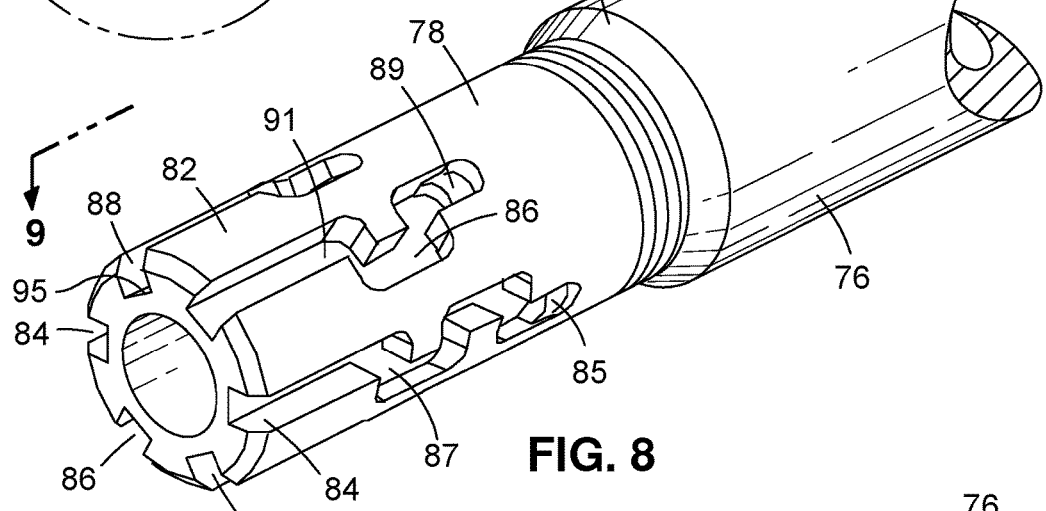
FIG. 8 is an enlarged, partial upper perspective view of an end portion of the spindle identified as section 8-8 in FIG. 7.
Figure 9:
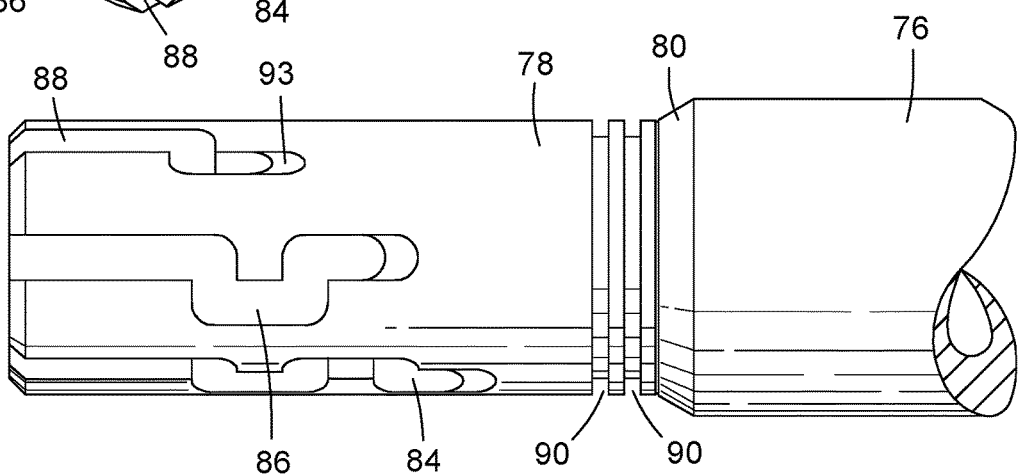
FIG. 9 is a top view of the enlarged, partial upper perspective view of the end portion of the spindle depicted in FIG. 8.

Referring now specifically to FIGS. 7-9, the control valve 10 additionally includes an elongate, generally cylindrical spindle 56 extending along a longitudinal axis 72. The spindle 56 includes a cylindrically configured proximal portion (e.g., a valve stem) 74, a cylindrically configured intermediate portion 76, and a cylindrically configured distal portion 78. The outer diameter of the intermediate portion 76 may exceed that of both the proximal portion 74 and the distal portion 78.

The spindle 56 may include a seating surface 80 extending between the intermediate portion 74 and the distal portion 78. The seating surface 80 may be angled relative to the outer surfaces of the intermediate portion 74 and distal portion 78. The angle of the seating surface 80 of the spindle 56 may be complementary to the seating surface 54 of the valve seat 12 to facilitate engagement between the spindle 56 and the valve seat 12 when the spindle 56 is in a closed position, as will be described in more detail below.

The distal portion 78 of the spindle 56 includes an outer surface 82 and a plurality of flow passages formed in the outer surface 82 to prescribed lengths and extending in generally parallel relation to the longitudinal axis 72 of the spindle 56. The plurality of flow passages may be spaced circumferentially about the outer surface 82 of the spindle 56. In the exemplary embodiment of the spindle 56 shown in FIGS. 7-9, the spindle 56 includes a diametrically opposed pair of first flow passages 84, a diametrically opposed pair of second flow passages 86, and a diametrically opposed pair of third flow passages 88. As such, a total of six flow passages are formed on the spindle 56. Each of the first, second, and third flow passages 84, 86, 88 has a generally tortuous, serpentine configuration defining a series of right-angle turns. In this regard, each flow passage 84, 86, 88 is considered to extend along at least two axes. As a result, certain sections or segments of each of the first, second, and third flow passages 84, 86, 88 extend in generally parallel relation to the spindle axis 72, whereas other segments extend generally circumferentially relative thereto.

As best seen in FIG. 8, the first, second, and third flow passages 84, 86, 88 are not of uniform length. Rather, the first flow passages 84 are of the greatest length and, in the exemplary embodiment, each define a total of six turns. The second flow passages 86 are of a reduced length in comparison to the first flow passages 84 and each define a total of four turns. Finally, the third flow passages 88 are of a reduced length in comparison to the second flow passages 86 and each define a total of two turns.

Each flow passage 84, 86, 88 may also have a variable depth (i.e., the distance the flow passage extends into the spindle from the outer surface 82 thereof), with a first depth extending into each flow passage 84, 86, 88 adjacent the closed end portions thereof (i.e., the portions positioned closest to the intermediate portion 76), and a second depth extending into each flow passage 84, 86, 88 for the remainder of the flow passage 84, 86, 88, with the second depth being greater than the first depth. Indeed, each first flow passage 84 may include a first depth surface 85 defining the first depth, and a second depth surface 87 defining the second depth. Similarly, each second flow passage 86 may include a first depth surface 89 defining the first depth, and a second depth surface 91 defining the second depth. Finally, each third flow passage 88 may include a first depth surface 93 defining the first depth, and a second depth surface 95 defining the second depth. The variable depths of the flow passages may create a three-dimensional aspect to each flow passage 84, 86, 88, wherein the depth creates a turn that is perpendicular to the longitudinal axis 72 of the spindle 56.

Although the change in depth is only shown adjacent the closed end portions of the flow passages 84, 86, 88, it is contemplated that additional variations in depth may be integrated at any location of the flow passages 84, 86, 88. Furthermore, although the exemplary embodiment includes flow passages that vary in length, it is contemplated that a spindle 56 having flow passages that are equal in length is also contemplated. Still further, other non-linear shapes or profiles for the flow passages 84, 86, 88, other than for the serpentine shape shown in FIGS. 1-2 and 7-9, is intended to be within the spirit and scope of the present disclosure.

In addition to having flow passages 84, 86, 88 formed in the outer surface 72 of the spindle 56, the spindle 56 may additionally include one or more, and preferably a pair, of labyrinth grooves 90 in spaced relation to each other to assist in clearance flow control in response to initial movement of the spindle 56 from its closed position to its open position. The labyrinth grooves 90 may be generally parallel to each other and may be formed within the distal portion 78 adjacent the seating surface 80.

Figure 3:
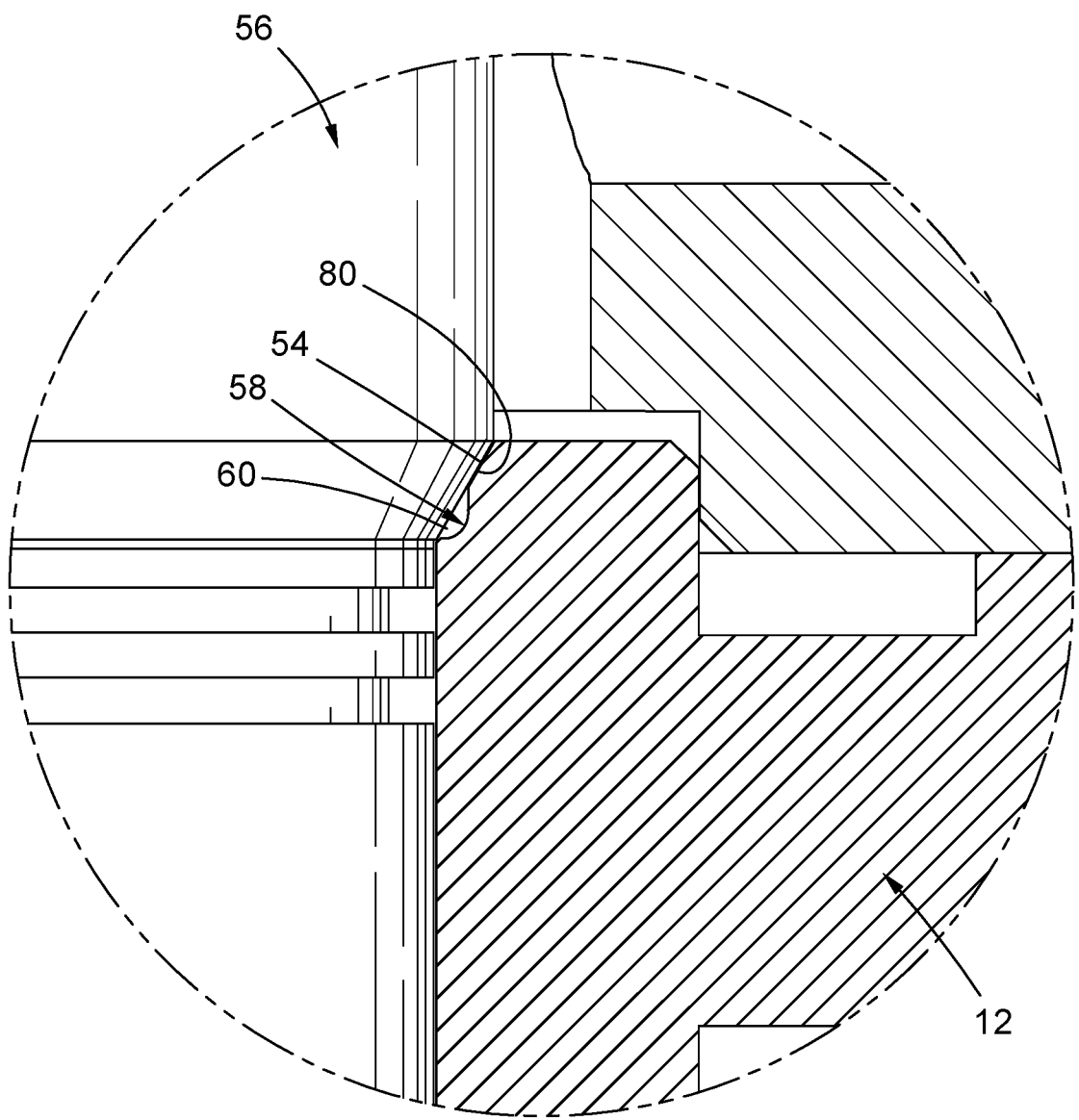
FIG. 3 is an enlarged view of section 3-3 identified in FIG. 2.

The spindle 56 is moveable relative to the valve seat 12 between closed and open positions. In FIGS. 1-3, the spindle 56 is shown in the closed position within the valve 10. When the spindle 56 is in the closed position, the intermediate portion 76 resides predominantly within the bore 26 of the guide bushing 24. Additionally, the distal portion 78 resides predominantly within the bore 70 defined by the valve seat 12. Moreover, the seating surface 80 of the spindle 56 may be in abutting, sealed engagement with the seating surface 54 of the valve seat 12. As a result, any fluid which flows through the inlet 16 and into the bore 26 of the guide bushing 24 and migrates between the spindle 56 and the valve seat 12 is effectively prevented from flowing from the bore 26 of the guide bushing 24 into the bore 70 of the valve seat 12. Furthermore, when the spindle 56 is in the closed position, the entire lengths of the first, second, and third flow passages 84, 86, 88 formed on the outer surface 82 of the spindle 56 are covered by the valve seat 12.

From the perspective shown in FIGS. 1 and 2, the movement of the spindle 56 to its open position is facilitate by the upward movement of the proximal portion 74 of the spindle 56 in any amount which is sufficient to cause the seating surface 80 of the spindle 56 to be separated from its sealed engagement to the seating surface 54 of the valve seat 12, which in turn, allows fluid to flow between the spindle 56 and the valve seat 12. The fluid may flow into the circular groove 60, which may provide a degree of expanded flow area to mitigate flashing near the intersection between the spindle 56 and the valve seat 12.

A more significant opening of the spindle 56 which results in a greater volume of fluid flow through the valve 10 occurs when the distal end portion 78 of the spindle 56 is elevated above a top edge of the inner surface 68 of the valve seat 12 and thus uncovers any portion of the first flow passages 84. Such movement allows for unrestricted fluid flow from the inlet 16 and into the first flow passages 84.

Upward movement of the spindle 56 results in the first flow passages 84 initially being uncovered or exposed, followed by the second flow passages 86, and finally the third flow passages 88. Once the upper ends of the first, second, and third flow passages 84, 86, 88 are exposed as a result of upward movement of the spindle 56 relative to the valve seat 12, continued upward movement of the spindle 56 may cause the inlet fluid to flow through a lesser number of turns within the flow passages 84, 86, 88 by virtue of the upper portions thereof progressively being uncovered by the retracting spindle 56. Thus, flow variation through the valve 10 may be affected by the number of turns within the first, second and third flow passages 84, 86, 88 which are exposed or not exposed as the spindle 56 reciprocally moves up and down relative to the valve seat 12.

Based on the above described of fluid flow through the valve 10, it is contemplated that the valve 10 is configured for over plug flow. However, it is contemplated that the valve 10, and in particular, the spindle 56 and valve seat 12, may alternatively be configured for under plug flow without departing from the spirit and scope of the present disclosure. In addition, those of ordinary skill in the art will recognize that certain inventive principles of the present dissolute, including the structural and functional attributes of the valve seat 12 as outfitted with the flashing mitigation groove 60 and the spindle 56 as outfitted with the flow passages 84, 86, 88 may be integrated into valves having other configurations other than for that exemplary configuration described above.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A fluid control valve comprising:
   a housing defining a fluid inlet and a fluid outlet;
   a valve seat coupled to the housing and positioned between the fluid inlet and the fluid outlet, the valve seat having:
     an inner surface defining a central bore extending along a seat axis;
     a non-linear groove surface extending from the inner surface and defining a groove extending around the seat axis, at least a portion of the groove surface extending radially outward relative to the seat axis; and
     a seating surface extending from the groove surface; and
   a spindle disposed within the housing and defining a longitudinal axis, the spindle having an outer surface and a plurality of flow passages formed in the outer surface to prescribed lengths and extending in generally parallel relation to the longitudinal axis of the spindle, the spindle including at least one labyrinth groove formed therein and surrounding the longitudinal axis, the spindle being moveable relative to the valve seat between closed and open positions, movement of the spindle from the closed position toward the open position allowing fluid to flow between the fluid inlet and the fluid outlet along at least one of the plurality of flow passages, the spindle being in abutting contact with seating surface when in the closed position.

2. The fluid control valve recited in claim 1, wherein the plurality of flow passages are spaced circumferentially about the outer surface of the spindle.

3. The fluid control valve recited in claim 1, wherein each of the plurality of flow passages extend along at least two axes.

4. The fluid control valve recited in claim 1, wherein the spindle includes a spindle end surface, the plurality of flow passages including a first flow passage extending from the spindle end surface in a direction parallel to the longitudinal axis to define a first length, and a second flow passage extending from the spindle end surface in a direction parallel to the longitudinal axis to define a second length greater than the first length.

5. The fluid control valve recited in claim 1, wherein the groove surface includes a first segment generally perpendicular to the seat axis, a second segment generally parallel to the seat axis and a corner segment connecting the first segment and the second segment.

6. The fluid control valve recited in claim 5, wherein the corner segment is rounded.

7. The fluid control valve recited in claim 1, wherein the seating surface extends at an angle relative to the seat axis.

8. The fluid control valve recited in claim 1, wherein the at least one labyrinth groove includes two or more labyrinth grooves disposed in spaced relation to each other.

9. The fluid control valve recited in claim 1, wherein a portion of the spindle is in contact with the seating surface when the spindle is in the closed position.

10. The fluid control valve recited in claim 1, wherein at least one of the plurality of flow passages is of variable depth.

11. A fluid control valve comprising:
a housing defining a fluid inlet and a fluid outlet;
a valve seat coupled to the housing and positioned between the fluid inlet and the fluid outlet, the valve seat extending around a seat axis and having:
an end surface extending around the seat axis;
a seating surface extending from the end surface toward the seat axis;
a non-linear groove surface extending from the seating surface and defining a groove extending around the seat axis, the groove surface including a first segment generally perpendicular to the seat axis, a second segment generally parallel to the seat axis and a rounded corner segment connecting the first segment and the second segment; and
an inner surface defining a central bore extending along the seat axis; and
a spindle disposed within the housing and reciprocally moveable between closed and open positions within the central bore of the valve seat, the spindle defining a longitudinal axis and having an outer surface and a plurality of flow passages formed in the outer surface to prescribed lengths and extending in generally parallel relation to the longitudinal axis of the spindle, the spindle being in abutting contact with seating surface when in the closed position.

12. The fluid control valve recited in claim 11, wherein the end surface is perpendicular to the seat axis.

13. The fluid control valve recited in claim 11, wherein the seating surface extends at an angle relative to a plane defined by the end surface, the angle being between 0-90 degrees.

14. The fluid control valve recited in claim 11, wherein a portion of the groove surface extends parallel to the seat axis.

15. The fluid control valve recited in claim 11, wherein the plurality of flow passages are spaced circumferentially about the outer surface of the spindle.

16. The fluid control valve recited in claim 11, wherein each of the plurality of flow passages extend along at least two axes.

17. The fluid control valve recited in claim 11, wherein the spindle includes a spindle end surface, the plurality of flow passages including a first flow passage extending from the spindle end surface in a direction parallel to the longitudinal axis to define a first length, and a second flow passage extending from the spindle end surface in a direction parallel to the longitudinal axis to define a second length greater than the first length.

18. A fluid control valve comprising:
a housing defining a fluid inlet and a fluid outlet;
a valve seat coupled to the housing and positioned between the fluid inlet and the fluid outlet, the valve seat having:
an inner surface defining a central bore extending along a seat axis;
a non-linear groove surface extending from the inner surface and defining a groove extending around the seat axis, at least a portion of the groove surface extending radially outward relative to the seat axis, the groove surface including a first segment generally perpendicular to the seat axis, a second segment generally parallel to the seat axis and a rounded corner segment connecting the first segment and the second segment; and
a seating surface extending from the groove surface; and
a spindle disposed within the housing and defining a longitudinal axis, the spindle having an outer surface and a plurality of flow passages formed in the outer surface to prescribed lengths and extending in generally parallel relation to the longitudinal axis of the spindle, the spindle being moveable relative to the valve seat between closed and open positions, movement of the spindle from the closed position toward the open position allowing fluid to flow between the fluid inlet and the fluid outlet along at least one of the plurality of flow passages, the spindle being in abutting contact with seating surface when in the closed position.

19. The fluid control valve recited in claim 18, wherein the spindle includes at least one labyrinth groove formed therein and surrounding the longitudinal axis.

20. The fluid control valve recited in claim 19, wherein the at least one labyrinth groove includes two or more labyrinth grooves disposed in spaced relation to each other.

* * * * *